US007428990B1

(12) United States Patent
Milford et al.

(10) Patent No.: US 7,428,990 B1
(45) Date of Patent: Sep. 30, 2008

(54) CAPACITIVE SENSING OF MEDIA INFORMATION IN AN INTERACTIVE MEDIA DEVICE

(75) Inventors: Peter Milford, Los Gatos, CA (US); Mark Flowers, Los Gatos, CA (US); David Wilson, Los Altos, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 298 days.

(21) Appl. No.: 11/023,316

(22) Filed: Dec. 22, 2004

(51) Int. Cl.
G06K 7/00 (2006.01)
(52) U.S. Cl. ........................ 235/439; 235/435; 235/440
(58) Field of Classification Search ................ 235/439, 235/435, 453, 492, 440, 375, 451
See application file for complete search history.

(56) References Cited

U.S. PATENT DOCUMENTS

| | | | | |
|---|---|---|---|---|
| 4,990,092 | A | * | 2/1991 | Cummings .................. 434/317 |
| 5,356,296 | A | * | 10/1994 | Pierce et al. ................ 434/317 |
| 5,359,374 | A | * | 10/1994 | Schwartz ..................... 40/455 |
| 5,437,552 | A | * | 8/1995 | Baer et al. .................. 434/317 |
| 5,453,013 | A | * | 9/1995 | Billings et al. .............. 434/169 |
| 5,511,980 | A | | 4/1996 | Wood .......................... 434/169 |
| 5,531,600 | A | * | 7/1996 | Baer et al. .................. 434/317 |
| 5,810,604 | A | * | 9/1998 | Kopp et al. ................. 434/317 |
| 6,064,855 | A | * | 5/2000 | Ho .............................. 434/317 |
| 6,167,233 | A | * | 12/2000 | Gresser et al. .............. 434/308 |
| 6,234,031 | B1 | * | 5/2001 | Suga ....................... 73/862.474 |
| 6,502,756 | B1 | | 1/2003 | Fahraeus |
| 6,608,618 | B2 | | 8/2003 | Wood et al. ................. 345/173 |
| RE38,286 | E | | 10/2003 | Flowers .................... 178/18.01 |
| 6,641,401 | B2 | | 11/2003 | Wood et al. ................. 434/159 |
| 6,661,405 | B1 | | 12/2003 | Flowers ...................... 345/173 |
| 6,668,156 | B2 | * | 12/2003 | Lynch et al. ................ 434/317 |
| 6,750,978 | B1 | | 6/2004 | Marggraff et al. .......... 358/1.12 |
| 6,966,495 | B2 | | 11/2005 | Lynggaard et al. |
| 7,111,774 | B2 | * | 9/2006 | Song .......................... 235/375 |
| 2004/0043371 | A1 | * | 3/2004 | Ernst et al. .................. 434/317 |
| 2004/0219501 | A1 | * | 11/2004 | Small et al. ................. 434/317 |
| 2006/0071912 | A1 | * | 4/2006 | Hill et al. .................... 345/173 |

FOREIGN PATENT DOCUMENTS

| | | |
|---|---|---|
| WO | 0073983 | 12/2000 |
| WO | 0101670 | 1/2001 |
| WO | 0116691 | 3/2001 |
| WO | 0126032 | 4/2001 |

(Continued)

OTHER PUBLICATIONS

Freescale Semiconductor, Inc.; Electric Field Imaging Device; Apr. 2004; www.freescale.com.

(Continued)

Primary Examiner—Thien M Le

(57) ABSTRACT

Detecting information relating to a medium in an interactive media device. The device includes a surface able to receive the medium and a sensor network embedded within the surface. The sensor network includes a configuration able to detect medium information. The device has a processor able to issue signals to the sensor network and to receive signals indicating capacitance change caused by proximity of a region of the medium to the sensor network. Thus, the processor is able to detect medium information based on the capacitance change.

34 Claims, 12 Drawing Sheets

FOREIGN PATENT DOCUMENTS

| | | |
|---|---|---|
| WO | 0171473 | 9/2001 |
| WO | 0171475 | 9/2001 |
| WO | 0175723 | 10/2001 |
| WO | 0175773 | 10/2001 |
| WO | 0175780 | 10/2001 |
| WO | 0195559 | 12/2001 |

OTHER PUBLICATIONS

Freescale Semicondutor, Inc.; Touch Panel Applications Using the MC33794 E-Field IC; Dec. 2003; www.freescale.com.

* cited by examiner

CAPACITIVE SENSING OF MEDIA INFORMATION IN AN INTERACTIVE MEDIA DEVICE

FIELD OF THE INVENTION

Embodiments of the present invention relate to the field of electronic circuits. Specifically, embodiments of the present invention relate to interactive media devices and page or sheet identification therein.

BACKGROUND ART

There are a variety of interactive electronic media devices in which a medium such as a book is placed on a device platform. The platform includes a detection system able to determine the portion of the book the user points to with a stylus or other pointing device. The platform then generates an appropriate response to the user. Such interactive books are sometimes known as "talking books," although more generally an interactive book may use audio and visual outputs to interact with a user. Typically, an interactive media device provides an audio output related to a position on a printed page. For example, an interactive media device for children may speak the names of words that the child points to with a stylus. As another example, the interactive media device initiates a game when the child points at a picture. Although interactive media device are commonly sold as children's toys, they also have numerous other potential applications as well, for example, providing an interactive media experience to a user.

Thus, in order to interact with the user, the interactive media device typically identifies what book is in the device and what page of the book is currently open to the user. When a user turns to a new page, some conventional devices require the user to contact a region of the page to allow the device to know which page is being displayed. Typically, this is done by instructing the user to point to or touch the stylus to a symbol on the page.

A drawback with many conventional interactive media devices is that the user must remember to point to particular symbol on each page of the device so that the output can be correctly associated with the symbols and text on a particular page. However, if the user forgets to touch the pointer to the required location symbol, the interactive media device will not know which page is open. Thus if a child fails to touch the symbol after turning the page, the child is confronted with audio signals and other feedback that do not correspond to the content of the current page, which reduces the interactive experience for the child.

SUMMARY OF THE INVENTION

Therefore, it would be advantageous to provide a method and device for automatically detecting information relating to a medium. Accordingly, embodiments of the present invention provide methods and devices that automatically detect media information, such as identifiers of sheets and/or pages, or books. Embodiments of the present invention are suitable for interactive media devices. Embodiments of the present invention provide these advantages and others not specifically mentioned above but described in the sections to follow.

An embodiment of the present invention is an apparatus for detecting a facing page of a document. The apparatus comprises a surface for receiving the document and sensors disposed within the surface. The sensors are able to detect proximity of markers disposed on or embedded within pages of the document. The apparatus also has a processor coupled to the sensors for reading signals output from the sensors and identifying a particular page of the document as a facing page based on a detected pattern of said markers corresponding to the particular page.

Another embodiment in accordance with the present invention is a claim to an interactive media device. The device comprises a surface able to receive a medium and a sensor network embedded within the surface. The sensor network comprises a configuration able to detect medium information, for example, page or sheet numbers. The apparatus may contain a processor able to issue signals to the sensor network and to receive signals indicating capacitance change caused by proximity of a region of the medium to the sensor network. Thus, the processor is able to detect information relating to the medium based on the capacitance change. In one embodiment, the capacitive sensing enables identification of a particular page or sheet of a book or scroll. Also, the capacitive sensing can be used to identify the book and/or scroll.

Another embodiment of the present invention is a claim to a method of detecting information relating to a medium on or in an interactive media device comprising a sensor network configured to determine medium information. The medium may be a book or a scroll. The method comprises issuing signals to the sensor network and receiving signals indicating changes in an electrical property caused by proximity of markers disposed on or embedded within the document to the sensor network. A pattern of is determined for the markers based on the received signals. Based on the pattern, document information is determined. In one embodiment, a particular page or sheet of a book or scroll is identified. In another embodiment, the book or scroll is identified. In yet another embodiment, a book or scroll and a particular page are identified.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
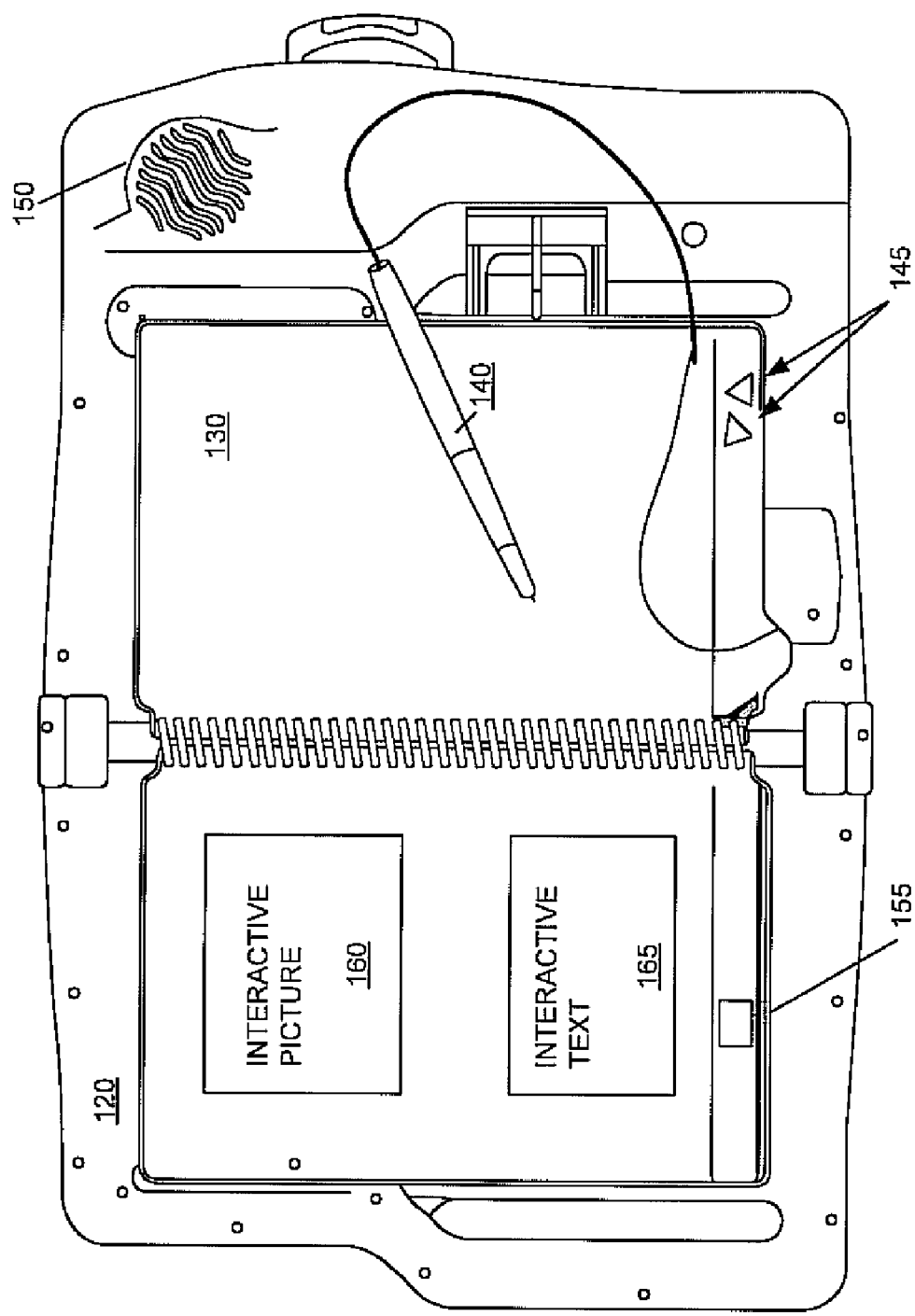
FIG. 1 is an exemplary interactive media-receiving platform and media information detection system, in accordance with an embodiment of the present invention.

In the following detailed description of embodiments of the present invention, capacitive sensing of media information in an interactive media device, numerous specific details are set forth in order to provide a thorough understanding of the present invention. However, it will be recognized by one skilled in the art that the present invention may be practiced without these specific details or with equivalents thereof. In other instances, well-known methods, procedures, and components have not been described in detail as not to unnecessarily obscure aspects of the present invention.

Notation and Nomenclature

Some portions of the detailed descriptions that follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying" or "receiving" or "issuing" or "processing" or "detecting" or "determining" or "storing" or "accessing" or "sensing" or "controlling" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One embodiment the invention comprises an interactive media platform and associated electronics. The platform is able to receive a book or other medium for use with an interactive reading and teaching system. The book may contain informational, instructional or entertainment material. The platform is combined with a microprocessor, speaker, stylus, and electronic means for detecting book information. The media information may include the title of the book and the page that is open to the user. However, the media information is not so limited.

FIG. 1 is an exemplary interactive book-based media-receiving platform and media information detection system, in accordance with an embodiment of the present invention. FIG. 1 illustrates a top view of an open book 130 on the surface of an interactive media-receiving platform 120. A stylus 140 is operatively coupled to platform 120. The open book 130 may have a binding, for example, a spiral spine and fits within a recess in the platform 120. The platform 120 has a sensor network (not depicted in FIG. 1) embedded in the platform 120 under the book pages and that senses regions on pages of the book 130. These regions of the book pages thus encode book information based on their location. The regions may be conductive, although this is not a requirement.

The book pages may also include symbols 145 for controlling the volume of sound heard through a speaker 150. The user may use the stylus 140 and touch or nearly touch the volume control symbols 145 to turn the volume up or down by selecting a "+" or "−" symbol. Other symbols 155 may be provided on the pages of the book 130 to hear words, spell words, and/or sound out words that are selected on the pages of the open book 130. For example, the user may select a "spell it" symbol and then select the word "leg" or picture of a leg. The user will subsequently hear the sequence of letters l-e-g through the speaker 150.

Other symbols may be provided on the pages of the book 130. For example, the user may select symbols for interactive games and learning activities. For example, after selecting a game symbol, a speech synthesizer in the platform may say "can you find a word with the letter L?" and the user can respond in kind by selecting the appropriate word with the stylus 140. In addition to having interactive symbols printed on the pages of the open book 130, interactive pictures 160 and text 165 may also be printed on the pages. For example, words or pictures may be highlighted to indicate to the user that they are selectable, and that the user will hear or see an audio or visual response to the selection. For instance, the user may select a picture of a fan and the sound of a fan may be produced by the platform. The position of the stylus 140 relative to the symbols in the book 130 may be determined by an electrographic positioning system embedded in the platform 120, although the present embodiment is not so limited. An electrographic position location apparatus and method is described in U.S. Pat. No. 6,661,405, which is assigned to the assignee of the present application, and is hereby incorporated herein by reference. In one embodiment, the sensor network is used to detect user interaction with the symbols. For example, the user may touch or nearly touch a symbol with a finger or other object such as a stylus. The device identifies the location of the symbol based on what portion of the sensor network detects a change in capacitance.

The exemplary platform has a structural design that allows easy placement of a book with a binding on the platform so that the pages of the book lie flat on the surface of the platform. The book and its pages also are easily positioned so that the pages consistently locate over a specific region of the platform, even when placed by a child. As the pages are turned by a user who progressively views and interacts with each page, the pages, after being turned, continue to lie flat either on the surface of the platform or as they stack on either side of the book binding. Furthermore, the book remains in its initial position on the platform in spite of the manipulation that occurs when the book pages are turned.

The platform is additionally configured so that the position of the book and pages is consistently located in proper relationship to the programmed regions for book information (e.g., title and page number). Consistent book positioning may be accomplished by providing a slot to accommodate the binding of the book. The pages of the book lie flat because the book is bound by, for example, a spiral, comb, or other ring type binding that allows the pages fall open and lie flat on a surface. In embodiments of the invention, the pages of the book are positioned consistently because of several design features of the platform and book. Guide tabs guide a page of the book as it is turned and falls into a recessed form of the platform that captures and evenly stacks the pages. Guide tabs are described in U.S. Pat. No. 6,668,156, which is assigned to the assignee of the present application, and is hereby incorporated by reference into the present application for all purposes.

Figure 5A:
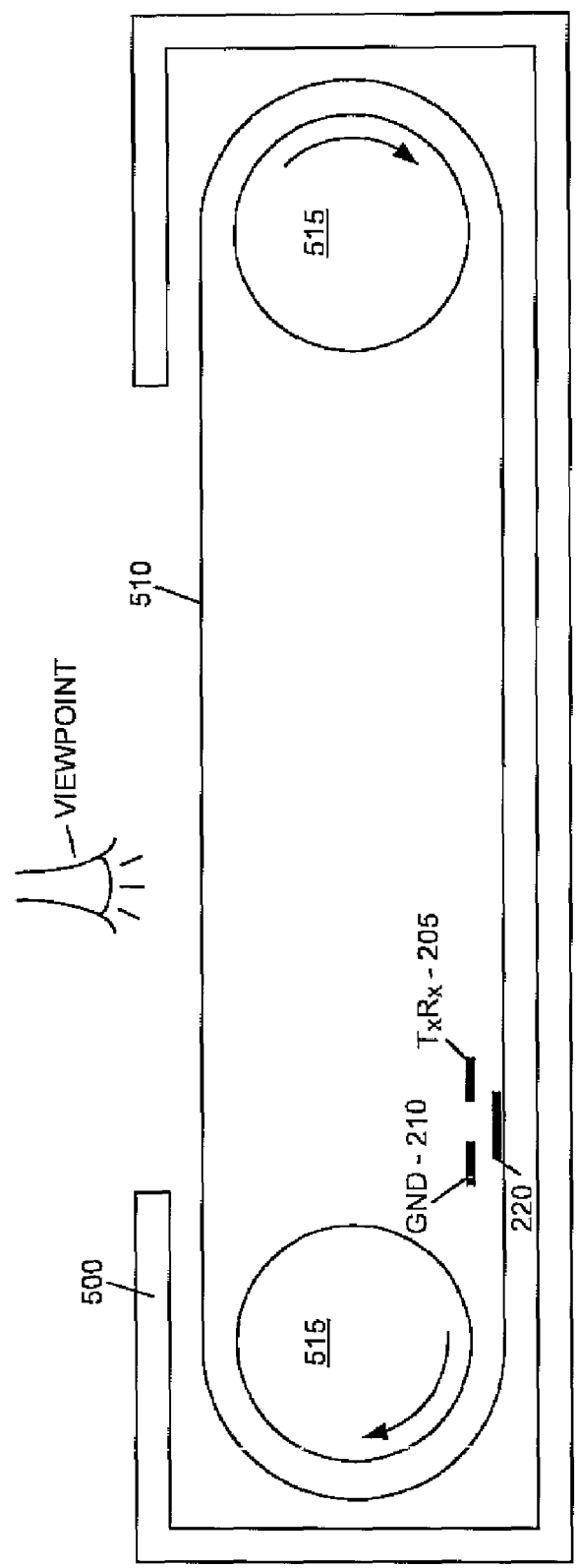
FIG. 5A is a side perspective view of an exemplary platform having a scroll form factor with sensors to detect media information, in accordance with an embodiment of the present invention.
Figure 5B:
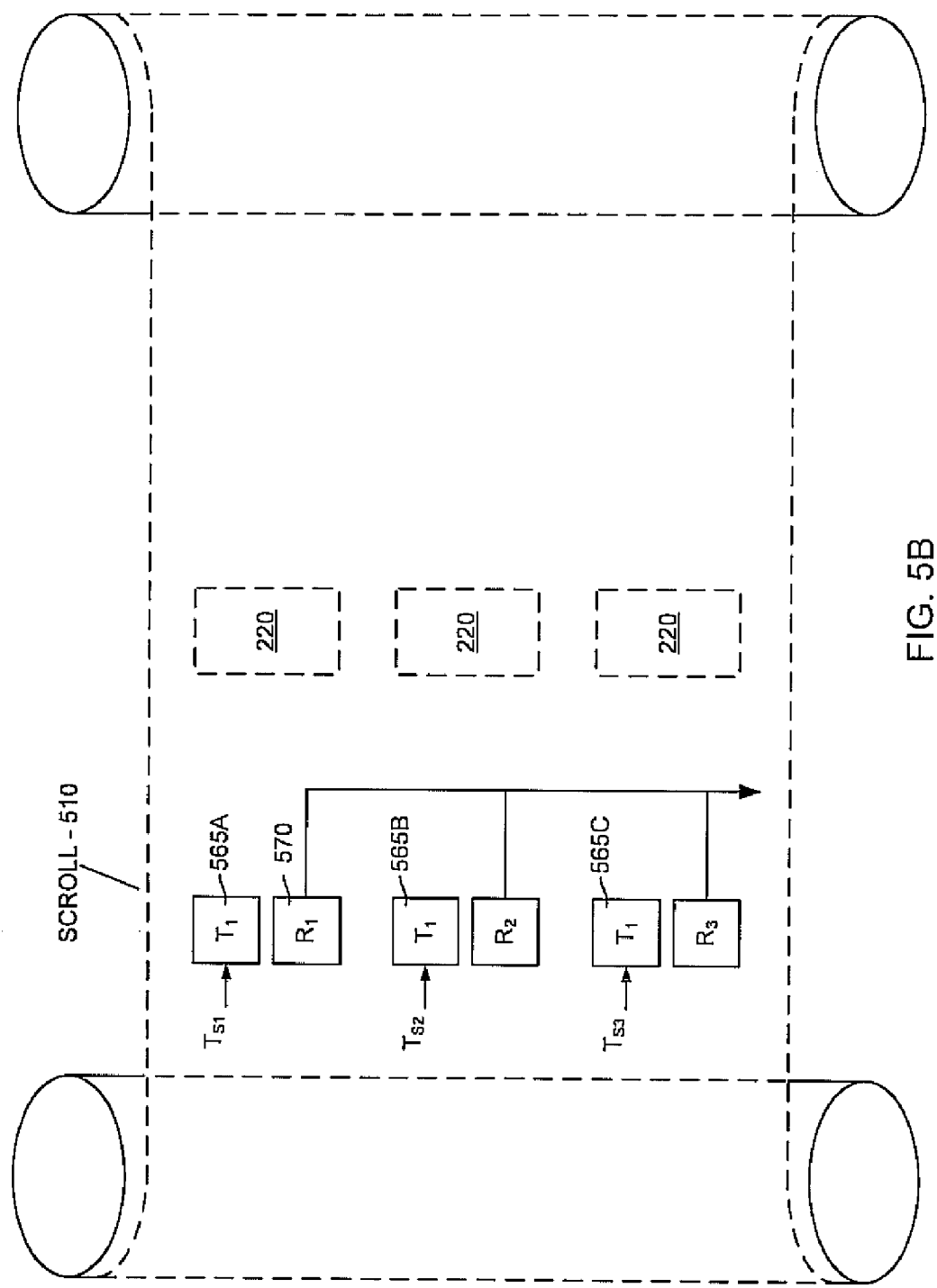
FIG. 5B is a top perspective view of the exemplary sensor network of FIG. 5A, in accordance with an embodiment of the present invention.
Figure 5C:
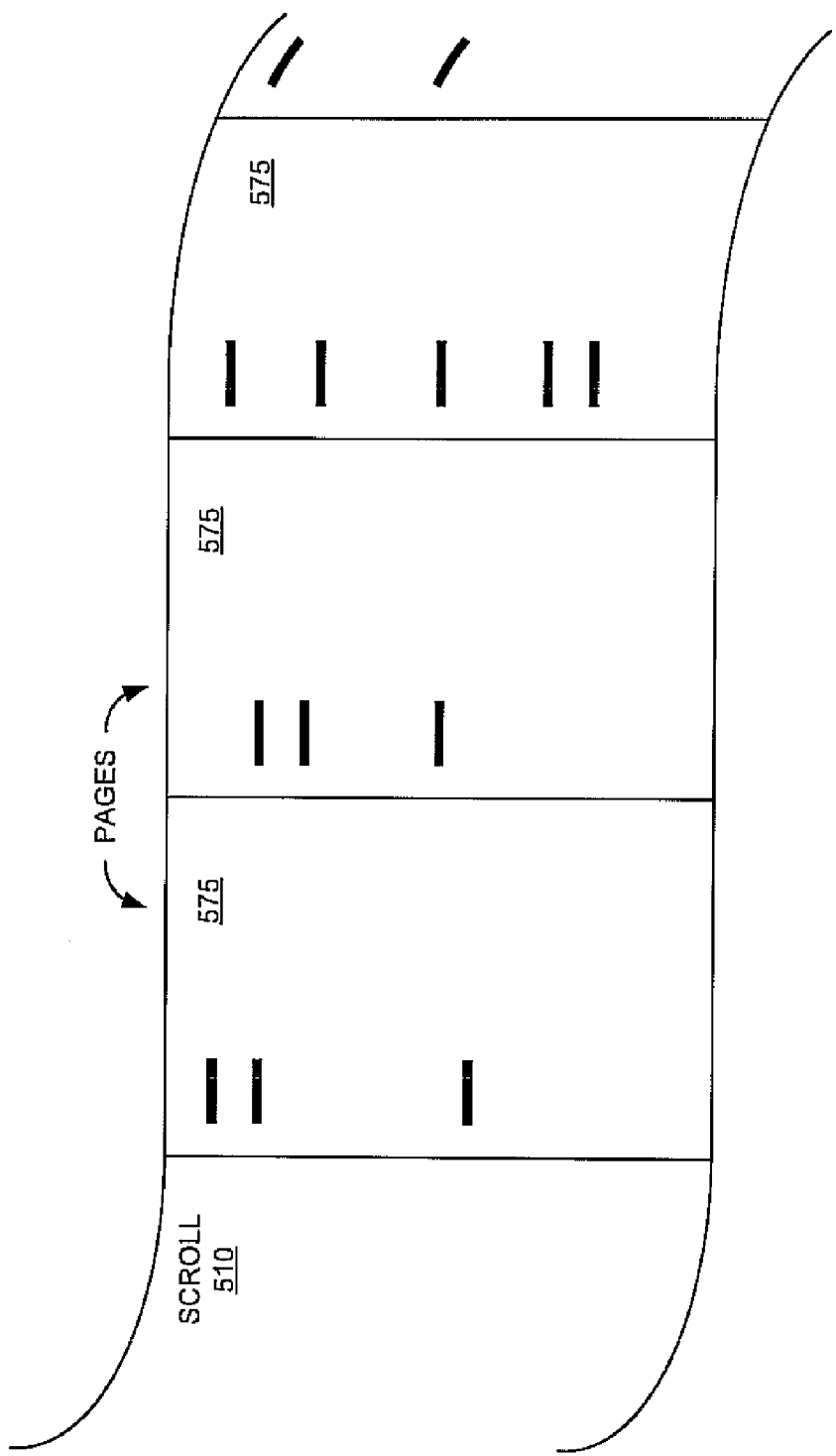
FIG. 5C is an illustration of a scroll having markers and a sensor network that detects the markers in accordance with the present invention detects.

The present invention is not limited to using the exemplary interactive media device of FIG. 1 as a platform for the disclosed sensor network described herein. For example, in one embodiment, the document has a scroll format rather than a book. FIGS. 5A-5C describe an embodiment in which the document is a scroll. In another embodiment, the document is a card. Further, it will be understood that the present invention is not limited to the medium being a document. For example, rather than a book or scroll, an element such as a block (e.g., a child's toy block) may be used with the interactive media device or other device. The document or other medium may be made of a wide range of materials, including but not limited to, paper, plastic and cloth.

Figure 2A:
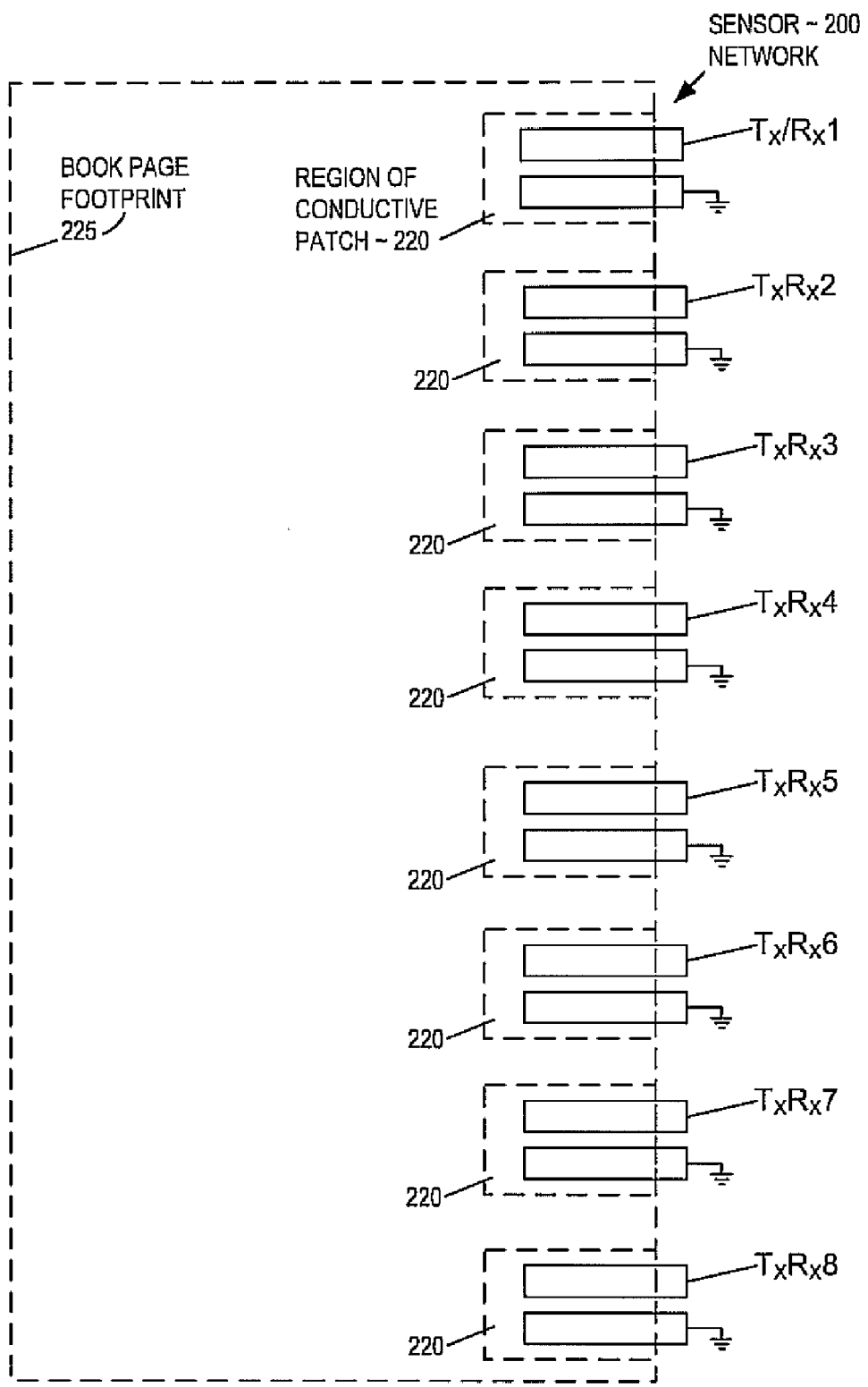
FIG. 2A is an exemplary sensor network able to detect medium information in an interactive media platform, in accordance with an embodiment of the present invention.

FIG. 2A is an exemplary sensor network 200 positioned within the book-receiving slot of device 120 and able to detect media information in an interactive media platform, in accordance with an embodiment of the present invention. Also depicted are positions in which markers 220 on book pages would overlay the sensor network 200. In this embodiment, each conductive marker 220 is located in a pre-determined position within the footprint of book pages 225 to cover one pair of sensor pads. The markers 220 may be on the front or backside of pages. For example, the markers 220 may be printed on the front or backside of the pages. It will be appreciated that some of the ink may penetrate the page in this case. Alternatively, the markers 220 may be embedded within the pages. In this case, a marker may be of a conductive material other than ink. The markers 220 are conductive in this embodiment. However, more generally, the markers may be any material that causes a measurable change in capacitance by, for example, altering a dielectric property in the sensor network 200. The sensor network 200 comprises pairs of sensor pads, in this embodiment; one pad is a transmit/receive pad 205 and the other pad is a ground pad 210.

Figure 2B:
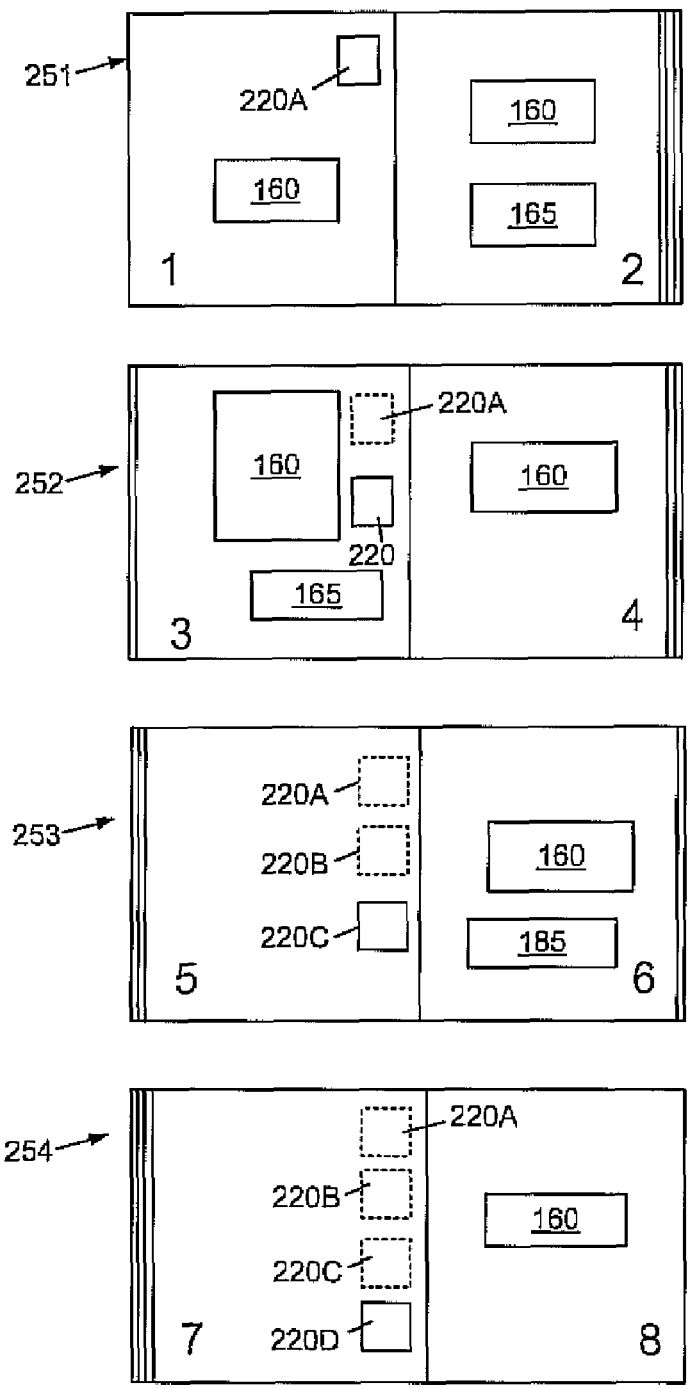
FIG. 2B is an illustration of marker location on various pages of a book that a sensor network in accordance with an embodiment of the present invention is able to detect.

Referring now to FIG. 2B, the page located conductive markers 220a-d typically affect the sensor network 200 when in proximity therewith even though multiple pages are stacked on top of each other overlaying the sensor network 200. FIG. 2B illustrates four page orientations 251-255 in which different pages are facing the viewer. Herein, these are referred to as facing pages. In orientation 251, the marker 220a is disposed on page one. The marker 220a may be on the facing or back side of page one. When the user turns the page to pages 3-4, the marker 220a for page one is now under the facing page three. The marker 220b for page three will have at least one page between it and the sensor network. When the user has turned to pages 7-8, the page seven marker 220d will have three pages between it and the sensor network. Therefore, the sensor network is able to detect proximity of an individual marker of a facing page through one or more other non-facing pages of the document.

Further, the various markers 220a-d do not overlap each other. Thus, the sensor network 200 is designed to operate with a book with no more than one conductive marker 220 overlaying a respective sensor pad pair, in this embodiment. The book may have a single conductive marker 220 in a different location of each page, in which case the sensor network 200 may be used for page identification. In other words, when a page of an inserted book is open, a pattern of markers 220 unique to the page is exposed (e.g., overlays) the sensors 200. This is true for all pages in the embodiment depicted in FIG. 2B.

However, it will be understood that in other embodiments the book may have more than one conductive marker per page and the sensor network 200 may be use to detect book information other than pages, such as book titles. The conductive markers may be formed of conductive ink; however, ink does not have to be used. In one embodiment, the ink is transparent. The conductive markers may be on the front of back side of the page.

When a conductive marker is in close proximity to a sensor pair, it increases the capacitance to ground from the transmit/receive pad 205. More generally, the markers may be any material that causes a measurable change in capacitance by, for example, altering a dielectric property between ground and the transmit/receive pad 205. The platform is able to detect this change in capacitance, by for example, detecting a change in voltage. For example, in this embodiment, a signal is sent to the transmit/receive pad when a reading is sought. An electrical property such as voltage is read at the transmit/receive pad to determine whether a conductive marker is in close proximity to the sensors.

Figure 4:
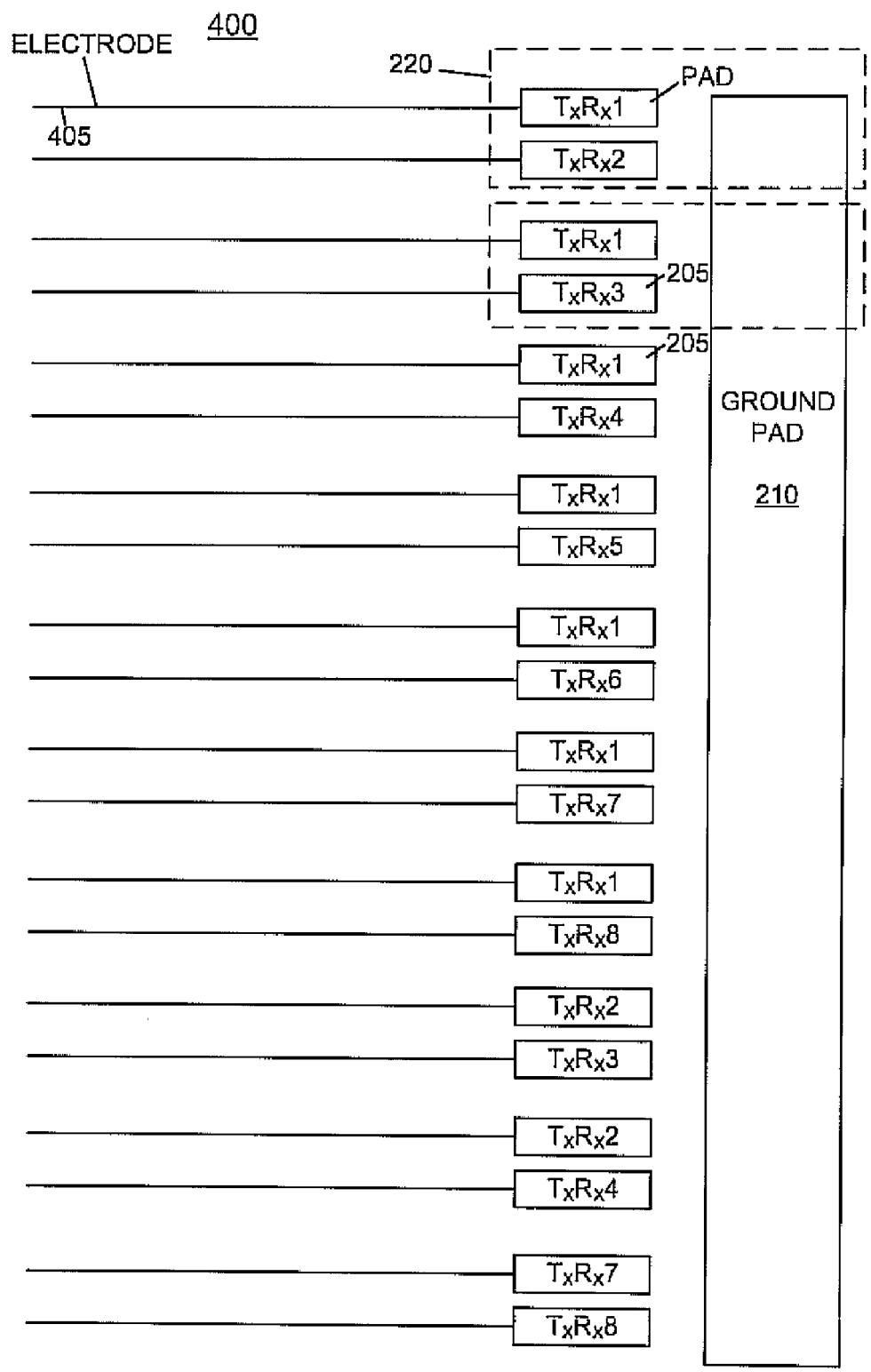
FIG. 4 is an exemplary sensor network having multiple-capacitor sensors, in accordance with an embodiment of the present invention.

In one embodiment, a sensor comprises two pads and forms at least one variable capacitor. The variable capacitor is positioned such that the medium as able to affect the capacitance (e.g., via change in dielectric property) to a degree that is detectable by the platform circuitry. It will be appreciated that modification to the two pads per sensor embodiment of FIG. 2A are possible. In another embodiment, each pair of sensor pads includes a separate transmit pad and a receive pad. Thus, in FIG. 2A the ground pad 210 would be replaced by a receive pad and the transmit/receive pad 205 would be replaced by a transmit pad. In this embodiment, a signal is sent to the transmit pad when a reading is sought. An electrical property such as voltage is read at the separate receive pad to determine whether a conductive marker is in close proximity to the sensor pad pair. It will be appreciated that the ground pad 210 in FIG. 2A may be implemented as a single contiguous pad. FIG. 4 depicts such an embodiment. The device may also comprise a redundant set of pads that reduce false readings from user proximity to the sensor network. For example, it may be possible that user proximity to a pad could change capacitance enough to cause a false reading, which is discarded by examining the readings of redundant sensor network.

Figure 3A:
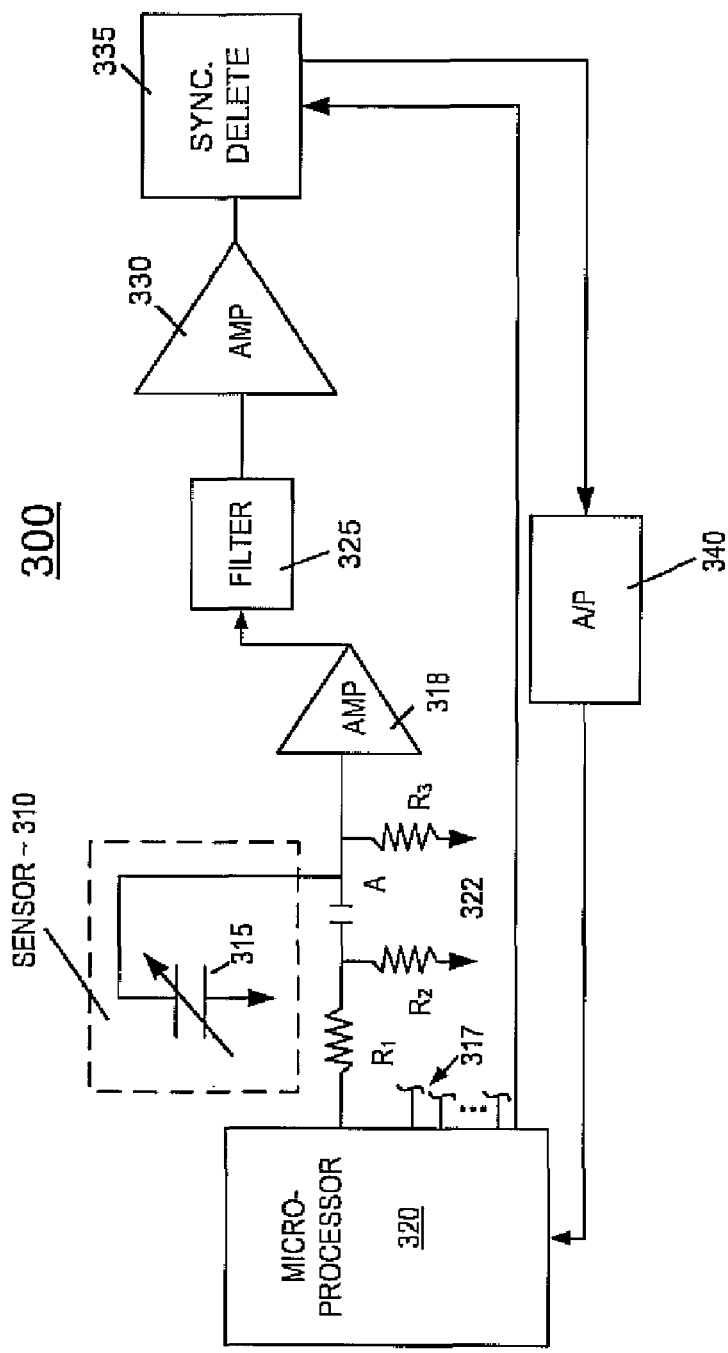
FIG. 3A is a diagram of a circuit able to detect medium information, in accordance with an embodiment of the present invention.

FIG. 3A is a circuit diagram illustrating principles of operation of embodiments of the present invention. The circuit 300 includes a sensor 310 modeled as a variable capacitor 315. In practice, the sensor 310 may comprise a transmit/receive pad (not depicted in FIG. 3) and a corresponding ground pad (not depicted in FIG. 3), with each sensor pad serving as one plate of the variable capacitor 315. When a conductive portion of a book page (or other conductive element) is in close proximity with the sensor 310, the capacitance of the variable capacitor 315 increases. Thus, the sensor pads are positioned such that the book is allowed to affect the dielectric of the variable capacitor 315 In one embodiment, the sensor network is used to detect user interaction with symbols or the like. For example, if a user touches or nearly touches a single pad, a variable capacitor is formed between the pad and ground, with the user's body forming the dielectric. Thus, the variable capacitor 315 comprises a single pad in a user touch embodiment.

The variable capacitor 315 in FIG. 3A forms a voltage divider with capacitor 322, wherein the voltage at node "A" is a function of the capacitance of the variable capacitor 315. Node "A" is coupled to the input of a high impedance amplifier 318 (e.g., JFET). The circuit 310 detects the change in capacitance by a change in voltage at the input of the amplifier 318. For example, the voltage at node "A" goes down in response to the variable capacitance going up. To detect the change in capacitance, the microprocessor 320 sends out a transmit signal to the sensor 310. The amplifier 318 detects the voltage at node "A," which is filtered and amplified, by filter 330 and amplifier 330. A synchronization detect 335 is controlled by a signal based on the transmit signal, wherein the analog-to-digital converter 340 receives a signal at the proper time. The A/D signal is input to the microprocessor 320. Thus, the microprocessor 320 is able to detect when a conductive element is placed in proximity to the sensor 310 by the change in the value from the A/D.

Only one sensor 310 and associated circuitry is depicted in FIG. 3A, although typically the sensor network will comprise many sensors 310. The circuit 300 has additional circuitry 317 for implementing the additional sensors 310. The additional circuitry 317 may include elements similar to the depicted resistors R1-R3 and capacitors 315 and 322, as well as amplifier 318. The additional circuitry 317 may also include additional elements. It will be appreciated that some of the circuitry depicted in FIG. 3A may be used in connection with multiple sensors 310.

The variable capacitor 315 in FIG. 3A forms a voltage divider with capacitor 322, wherein the voltage at node "A" is a function of the capacitance of the variable capacitor 315. Node "A" is coupled to the input of a high impedance amplifier 318 (e.g., JFET). The circuit 310 detects the change in capacitance by a change in voltage at the input of the amplifier 318. For example, the voltage at node "A" goes down in response to the variable capacitance going up. To detect the change in capacitance, the microprocessor 320 sends out a transmit signal to the sensor 310. The amplifier 318 detects the voltage at node "A," which is filtered and amplified, by filter 325 and amplifier 330. A synchronization detect 335 is controlled by a signal based on the transmit signal, wherein the analog-to-digital converter 340 receives a signal at the proper time. The A/D signal is input to the microprocessor 320. Thus, the microprocessor 320 is able to detect when a conductive element is placed in proximity to the sensor 310 by the change in the value from the A/D.

Figure 3B:
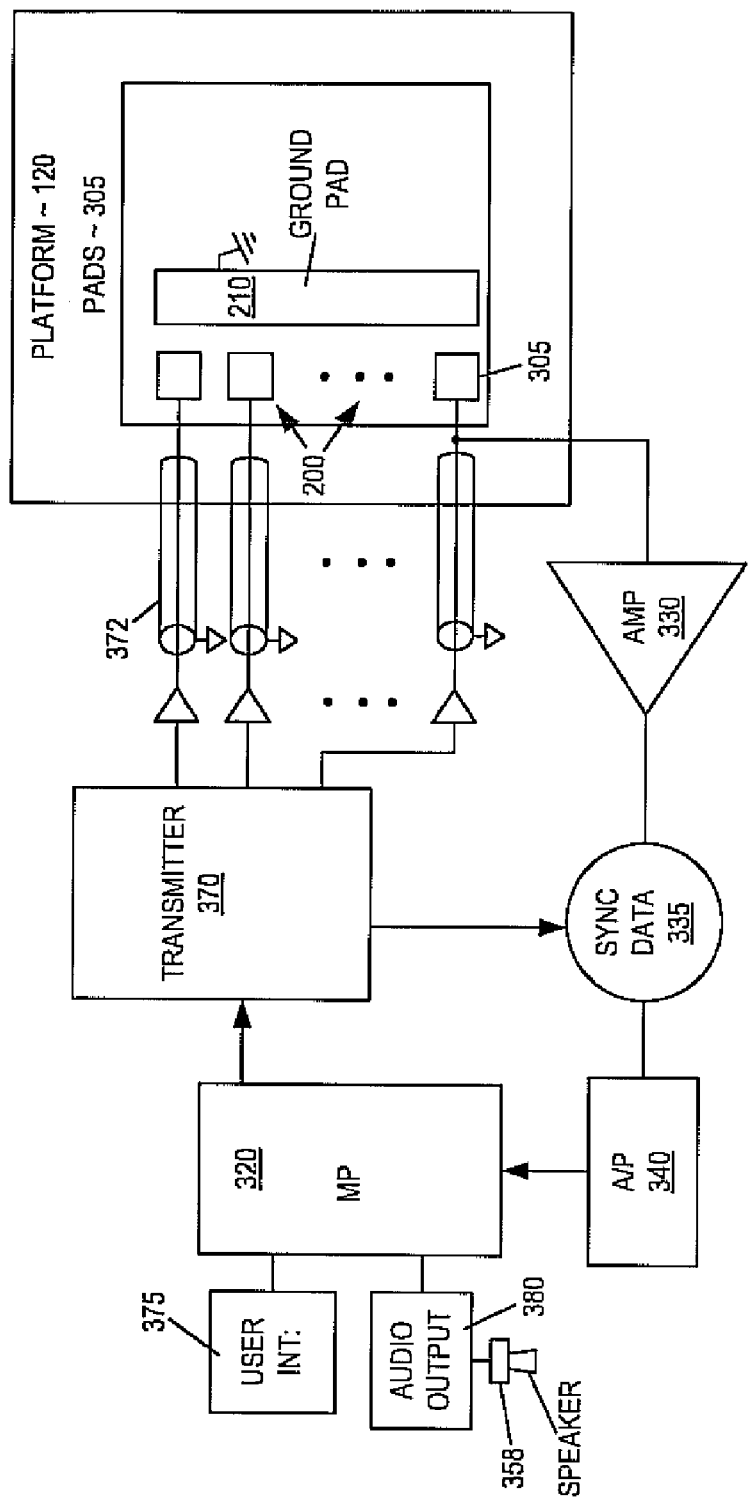
FIG. 3B is a block diagram of a circuit able to detect medium information, in accordance with an embodiment of the present invention.

FIG. 3B is a block diagram of a circuit able to detect medium information, in accordance with an embodiment of the present invention. The processor 320 sends commands to the transmitter 370, to cause a sequence of transmit signals to the pads 305 via electrodes 372. The processor 320 receives signals from the A/D 340 that indicate capacitive changes in the sensor network 200 in the platform 120. The processor 320 is coupled to audio output 380, which drives the speaker 385. In one embodiment, the processor 320 controls the audio output based on the page and book that was detected. The processor 320 is also coupled to user interface 375. While grounded shields are used in the embodiment of FIG. 3B, active driven shields may be used to reduce the capacitance to ground in the electrodes.

FIG. 4 is an exemplary sensor network 400 employing two transmit/receive pads 205 per sensor, in accordance with an embodiment of the present invention. For example, each book conductive region 220 overlays a pair of transmit/receive pads 205 and the ground pad 210. Thus, each sensor comprises two variable capacitors.

In this embodiment, the sensor network 400 is configured such that transmit/receive pads 205 are paired together to allow more information to be identified without increasing the number of electrodes. For example, there are eight transmit/receive electrodes 405 in FIG. 4. However, a given electrode 405 (e.g., TxRx1) is coupled to numerous pads 205. This may allow, for example, not only the page to be uniquely identified, but also information such as the title of the book. Therefore, the platform can automatically identify the book so that a user (e.g., child) does not have to.

It will be appreciated that the configuration of FIG. 4 is exemplary of a way to pair transmit/receive pads and the other configurations are within the scope of this embodiment. In additional embodiments, each sensor comprises three or more variable capacitors to allow for even greater amount of information to be identified without increasing the number of electrodes. For example, a sensor may comprise a TxRx1 pad, TxRx2 pad, TxRx3 pad, and a shared (or separate) ground pad.

FIG. 5A is a side perspective view of an exemplary platform 500 having a scroll form factor with sensors to detect media information, in accordance with an embodiment of the present invention. The scroll form factor allows a scroll 510 to be placed on the rollers 515. The scroll may be divided into sections referred to as pages or sheets. For example, FIG. 5C depicts a scroll 510 divided into several pages 575. The scroll 510 has conductive markers 220 that are detected by the sensor network, thus allowing identification of the scroll and "page" number facing the viewer. In this case, the sensors comprise a TxRx pad 205 and a ground pad 210. However, other sensor configurations may be used, such as, a transmit pad and a receive pad, or multi-pad configurations such as depicted in FIG. 4. In one embodiment, the rollers 515 are under control of a microprocessor, which uses information detected by the sensor network to control scroll motion.

FIG. 5B is an exemplary sensor network able to detect media information in an interactive media platform having a scroll form factor, in accordance with an embodiment of the present invention. FIG. 5B is a view of FIG. 5A from "viewpoint." In FIG. 5B, a sensor comprises a transmit pad 565 and a receive pad 570. However, a sensor can also be formed of a transmit/receive pad and a ground pad similar to FIG. 1. Further, a multi-pad sensor similar to FIG. 4 may be employed. FIG. 5B illustrates three sensors; however, many more sensors may be used. The scroll 510 illustrates the locations for three potential conductive markers 220.

In the embodiment of FIG. 5B, the transmit signals Ts1-Ts3 are time multiplexed, such that at any time only one of the transmit one pads 565a-565c will have an active signal. This allows the receive pads 570 to be electrically coupled and spatially multiplexed such that several receive pads 570 can share the same circuitry that detects capacitive changes in response to a conductive marker 220 being near a sensor.

In one embodiment, the coding on the scroll 510 is sequential. For example, there are additional columns of conductive markers 220 on the scroll 510. This allows far more code options than with a single column of conductive markers 220. Moreover, because the conductive markers 220 in a given column of the scroll 510 are not overlapped by another column, the embodiment of FIGS. 5A-5C allows $2^n$ bits of information to be encoded. For example, unlike a book embodiment of FIG. 1, pages on a scroll do not overlap (see e.g., FIG. 5C). This allows efficient encoding of both the page and a scroll identifier. For example, Table 1 depicts an implementation in which five bits are used to identify what scroll is in the interactive media device and three bits are used to encode the page currently viewable.

TABLE 1

| BIT | 0 | 1 | 2 | 3 | 4 | 5 | 6 | 7 |
|---|---|---|---|---|---|---|---|---|
| | Scroll Identifier | | | | | Page Identifier | | |

Another aspect of a scroll embodiment is that the signal strength increases substantially as the conductive markers 220 overlay the sensor network. This allows control of scroll motion based on the alignment of the conductive markers to the sensor network.

Figure 6A:
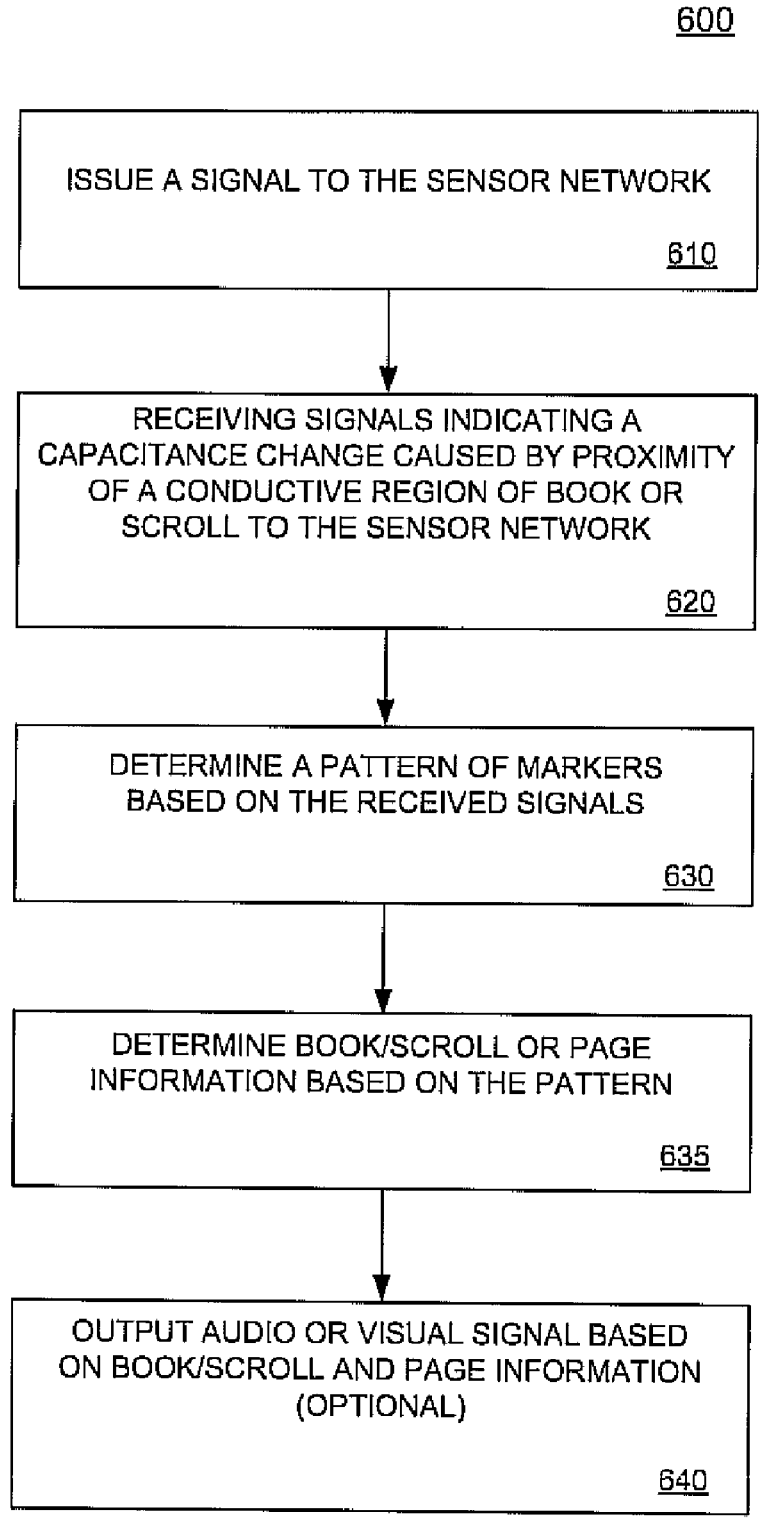
FIG. 6A is a flowchart illustrating steps of a process of detecting book and page information, in accordance with an embodiment of the present invention.

FIG. 6A is a flowchart illustrating steps of a process 600 of detecting medium information in an interactive media platform, in accordance with an embodiment of the present invention. Step 610 is issuing signals to the sensor network.

Step 620 is receiving signals indicating a capacitance change caused by proximity of a marker of the document to the sensor network. The marker may be a conductive region. The document may be a book, scroll, or even a toy such as a child's toy block. The signal may be a voltage reading, wherein the voltage changes in response to a capacitance change.

Step 630 is determining a pattern of the markers based on the received signals. Step 635 is determining information relating to the medium based on a relationship between the sensor configuration and the capacitance change. The information may include the title of the book or scroll and what page(s) of the book/scroll are currently overlaying the sensor network. The information might also include identification of a particular toy, such as a child's block.

Optional step 640 is outputting audio or visual information based on the book/scroll and page information. Step 640 may also be based on user input, such as user identification of a symbol on the page. The process 600 then ends.

Figure 6B:
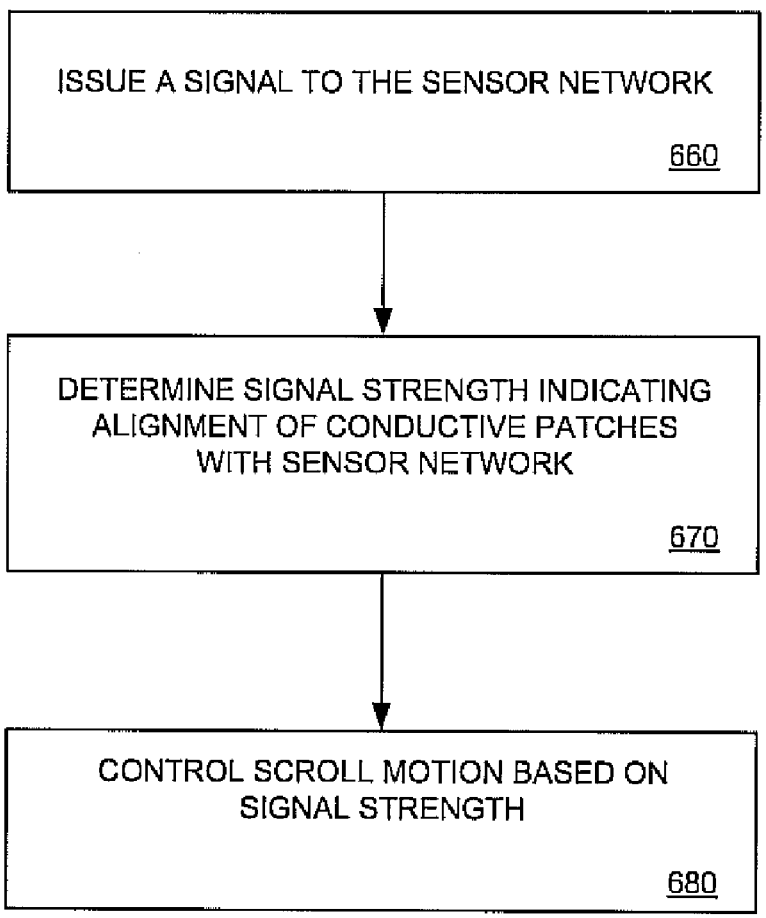
FIG. 6B is a flowchart illustrating steps of a process of controlling scroll motion, in accordance with an embodiment of the present invention.

FIG. 6B is a flowchart illustrating steps of a process 650 of controlling a scroll in an interactive media platform, in accordance with an embodiment of the present invention. Step 660 is issuing a signal to the sensor network. The signal is one of a number of signals transmitted to various pads in the sensor network. Step 670 is determining signal strength indicating alignment of conductive markers on the scroll with a sensor network. Step 680 is controlling the scroll based on the signal strength. For example, a page of the scroll can be aligned in the platform based on the alignment of the book markers to the sensor network.

While embodiments have described the book or scroll markers as being conductive, it will be appreciated that the markers do not have to be conductive. More generally, the markers may be any material that causes a measurable change in capacitance by, for example, altering a dielectric property in the sensor network.

Exemplary Computer Platform

Figure 7:
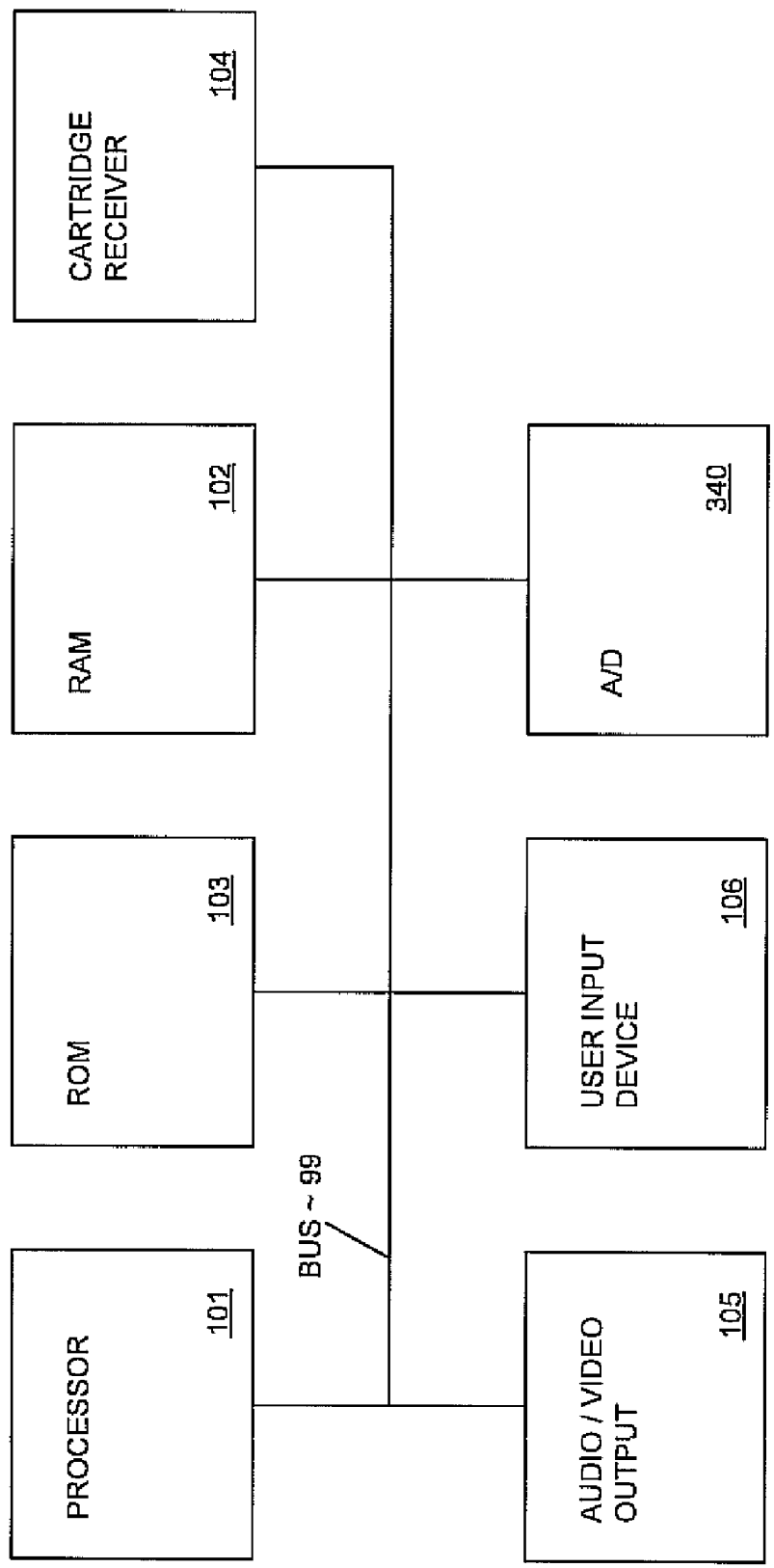
FIG. 7 is an exemplary computer system that may serve as a platform upon which embodiments of the present invention may be executed.

FIG. 7 illustrates circuitry of an exemplary computer system 100, which may form a platform for embodiments of a method and device for detecting information relating to a medium. Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101.

The cartridge receive unit 104 may be used for cartridges that enhance the interactive media experience. For example, a cartridge may contain instructions that when executed by the processor 101 enhances the user experience with a book or scroll in an interactive media device. The audio/video output 105 allows interactive media experiences based on the book or scroll and its current page. The user input device 106 may include a stylus, which allows identification of a symbol on a page. The A/D 340 allows various signals such as a voltage change indicative of a capacitive change to be interpreted by the processor 101.

The preferred embodiment of the present invention, capacitive sensing of medium information in an interactive media device, are thus described. While the present invention has been described in particular embodiments, it should be appreciated that the present invention should not be construed as limited by such embodiments, but rather construed according to the below claims.

We claim:

1. An apparatus for detecting a facing page of a document, said apparatus comprising:
   a surface for receiving said document;
   a plurality of sensors disposed within said surface, said plurality of sensors for detecting proximity of markers of pages of said document; and
   a processor independently coupled to each sensor of said plurality of sensors for reading signals output from said sensors and for independently detecting any sensor output and identifying a particular page of said document as said facing page based on a detected pattern of said markers corresponding to said particular page.

2. An apparatus as described in claim 1 wherein said plurality of sensors are variable capacitors and wherein a capacitance of each variable capacitor changes responsive to proximity of an individual marker.

3. An apparatus as described in claim 1 wherein said markers are conductive.

4. An apparatus as described in claim 1 wherein said markers are disposed on the back sides of individual pages of said document.

5. An apparatus as described in claim 1 wherein said markers are disposed on the front sides of individual pages of said document.

6. An apparatus as described in claim 1 wherein said markers are substantially transparent.

7. An apparatus as described in claim 1 wherein said markers are printed on individual pages of said document.

8. An apparatus as described in claim 1 wherein said markers are embedded within individual pages of said document.

9. An apparatus as described in claim 1 wherein said document is a scroll comprising a plurality of pages disposed linearly therein.

10. An apparatus as described in claim 1 wherein said document is a bound book comprising a binding.

11. An apparatus as described in claim 1 wherein said processor identifies said particular page in response to a detected change in capacitance as signaled by said plurality of sensors.

12. An apparatus as described in claim 1 wherein each page of said pages of said document has an associated unique facing-page pattern of markers as detected by said plurality of sensors.

13. An apparatus as described in claim 1 wherein each sensor of said plurality of sensors is operable to detect proximity of an individual marker of a facing page through one or more other non-facing pages of said document.

14. An apparatus as described in claim 13 wherein said detected pattern of said markers corresponding to said particular page comprises a marker on said facing page and one or more markers on non-facing pages of said document.

15. A method of detecting information relating to a document associated with an interactive media device comprising a sensor network configured to determine document information, said method comprising:
  issuing signals to the sensor network;
  receiving signals indicating changes in an electrical property caused by proximity of document markers to the sensor network;
  determining a pattern of said markers based on the received signals by independently detecting any sensor output for each sensor of said sensor network; and
  determining document information based on the pattern.

16. The method of claim 15, wherein said determining document information comprises identifying of a particular book of recognizable books.

17. The method of claim 15, wherein said determining document information comprises identifying a scroll.

18. The method of claim 15, wherein said determining document information comprises identifying a page of the document overlaying said sensor network.

19. The method of claim 15, further comprising controlling scrolling the document based on alignment of the markers to the sensor network.

20. An interactive media device, comprising:
  a surface operable to receive a medium;
  a sensor network embedded within said surface, wherein said sensor network is operable to detect medium information; and
  a processor independently coupled to each sensor of said sensor network, wherein said processor is operable to issue signals to the sensor network and to receive signals indicating capacitance change caused by proximity of a region of the medium to the sensor network;
  wherein said processor is operable to independently detect any sensor output, and wherein said processor is further operable to detect medium information based on the capacitance change.

21. The device of claim 20, wherein the medium information comprises identification of a book.

22. The device of claim 21, wherein the medium information comprises identification of a page of the book overlaying said sensor network.

23. The device of claim 20, wherein the medium information comprises identification of a page of a book overlaying said sensor network.

24. The device of claim 20, wherein said sensor network comprises pads that are configured to form plates of variable capacitors.

25. The device of claim 24, wherein said pads are positioned to allow the medium to cause a detectable change in a dielectric property of said variable capacitors.

26. The device of claim 20, wherein the medium information comprises identification of a scroll.

27. The device of claim 26, wherein the medium information comprises identification of a page of the scroll overlaying said sensor network.

28. The device of claim 26, wherein said processor is further operable to control motion of said scroll based on alignment of said region of the medium with said sensor network.

29. The device of claim 20, wherein said medium comprises a block.

30. The device of claim 20, wherein said processor is further operable to output interactive media signals based on the detected medium information.

31. The device of claim 20, wherein said sensor network comprises sensors having pairs of electrode pads forming a plurality of respective variable capacitors.

32. The device of claim 20, wherein said sensor network comprises sensors having electrode pads forming two variable capacitors per sensor.

33. The device of claim 20, wherein said sensor network comprises sensors having electrode pads forming three or more variable capacitors per sensor.

34. The device of claim 20, wherein said sensor network comprises a redundant set of electrodes operable to reduce false readings from user proximity to said sensor network.

\* \* \* \* \*